(12) United States Patent
Laforge et al.

(10) Patent No.: US 11,320,308 B2
(45) Date of Patent: May 3, 2022

(54) SYSTEM AND METHOD FOR SHAPING INCOHERENT LIGHT FOR CONTROL OF CHEMICAL KINETICS

(71) Applicant: The Trustees of Princeton University, Princeton, NJ (US)

(72) Inventors: François Laforge, East Windsor, NJ (US); Herschel Rabitz, Lawrenceville, NJ (US); Howard Y. Bell, Princeton, NJ (US); Joshua E. Collins, Wallingford, PA (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 17/260,303

(22) PCT Filed: May 17, 2019

(86) PCT No.: PCT/US2019/032895
§ 371 (c)(1),
(2) Date: Jan. 14, 2021

(87) PCT Pub. No.: WO2020/018174
PCT Pub. Date: Jan. 23, 2020

(65) Prior Publication Data
US 2021/0285817 A1 Sep. 16, 2021

Related U.S. Application Data

(60) Provisional application No. 62/699,323, filed on Jul. 17, 2018.

(51) Int. Cl.
*G01J 3/30* (2006.01)
*G01J 3/10* (2006.01)
*G01J 3/14* (2006.01)
*G01J 3/42* (2006.01)
*G01J 3/02* (2006.01)
(Continued)

(52) U.S. Cl.
CPC ............... *G01J 3/10* (2013.01); *G01J 3/0297* (2013.01); *G01J 3/14* (2013.01); *G01J 3/42* (2013.01);
(Continued)

(58) Field of Classification Search
CPC ............... G01N 21/718; G01N 21/645; G01N 21/6458; G01J 3/4406; G01J 3/02
(Continued)

(56) References Cited

U.S. PATENT DOCUMENTS 3,949,226 A 4/1976 Dugan et al.
4,087,342 A 5/1978 Bloomfield
(Continued)

OTHER PUBLICATIONS

International Search Report and Written Opinion for PCT/US2019/032895, dated Aug. 20, 2019.
(Continued)

*Primary Examiner* — Md M Rahman
(74) *Attorney, Agent, or Firm* — Meagher Emanuel Laks Goldberg & Liao, LLP.

(57) ABSTRACT

Disclosed is a system and method for shaped incoherent light for control (SILC). More particularly, disclosed is a method for controlling the evolution of photo-responsive systems (including chemical species, biochemical species or material compounds) using a device capable of producing shaped incoherent light for such control. The disclosed device integrates a polychromatic incoherent source in an adaptive feedback control loop.

15 Claims, 11 Drawing Sheets

(51) Int. Cl.
*G01N 21/63* (2006.01)
*G01J 3/12* (2006.01)

(52) U.S. Cl.
CPC ...... *G01N 21/636* (2013.01); *G01J 2003/104* (2013.01); *G01J 2003/1286* (2013.01); *G01J 2003/423* (2013.01)

(58) Field of Classification Search
USPC .......................................................... 356/318
See application file for complete search history.

(56) References Cited

U.S. PATENT DOCUMENTS 4,626,684 A 12/1986 Landa
2015/0062903 A1 3/2015 Hu et al.

OTHER PUBLICATIONS

Nurenberger et al., "Femtosecond quantum control of molecular dynamics in the condensed phase", Phys. Chem. Chem. Phys. vol. 9, pp. 2470-2497, 2007.

Prechen et al., "Teaching the environment to control quantum systems", Physical. Rev. A 73, 062102 (2006), published on arXiv Sep. 12, 2006.

Shir et al., "Efficient retrieval of landscape Hessian: Forced optimal covariance adaptive learning", Phys. Rev. E, vol. 39, 063306-1-16, 2014.

Zhou et al., "A Low-Noise, Large-Dynamic-Range-Enhanced Amplifier Based on JFET Buffering Input and JFET Bootstrap Structure", IEEE Sensors Journal. Vol. 15, No. 4, 2101-2015, 2015.

Scaiano et al., "Intrazeolite Photochemistry: Toward Supramolecular Control of Molecular Photochemistry", Accounts of Chemical Research vol. 32, pp. 783-793, 1999.

Frei, "Chemistry with Red and Near Infrared Light", CHIMIA International Journal for Chemistry 45, pp. 175-190, 1991.

Wang et al., "Upconversion Multicolor Fine-Tuning: Visible to Near-Infrared Emission from Lanthanide-Doped NaYF4 Nanoparticles", Journal of the American Chemical Society, vol. 130, pp. 5642-5643, 2008.

R. M. MacFARLANE et al., "Blue, green and yellow upconversion lasing in Er:YLiF4 using 1.5 pm pumping", Electronics Letters, vol. 28, No. 23, pp. 2136-2138, Nov. 5, 1992.

SYSTEM AND METHOD FOR SHAPING INCOHERENT LIGHT FOR CONTROL OF CHEMICAL KINETICS

STATEMENT REGARDING FEDERALLY SPONSORED RESEARCH OR DEVELOPMENT

This invention was made with government support under Grant No. W911NF-16-1-0014 awarded by the U.S. Army/Army Research Office and Grant No. CHE-1464569 awarded by the National Science Foundation. The government has certain rights in the invention.

BACKGROUND

For many decades, physicists and chemists have employed various spectroscopic methods to carefully observe quantum systems on the atomic and molecular scale. The fascinating feature of quantum control is the ability to not just observe but actively manipulate the course of physical and chemical processes, thereby providing hitherto unattainable means to explore quantum dynamics. This remarkable capability along with a multitude of possible practical applications have attracted enormous attention to the field of control over quantum phenomena.

Although coherent control of molecules with ultrafast lasers has yielded numerous successes and is continuously progressing, obtaining the necessary coherent optical resources remains an ongoing endeavor. While this effort pushes forward, there is good reason to re-examine the prospects of utilizing incoherent radiation resources. Control over photodissociation channels of $Na_2$ molecules using two incoherently related intense lasers has already been shown.

However, to date, no work has been able to retain the attractiveness of controlling chemical kinetics to an acceptable degree while utilizing commercially available light sources that are inexpensive, user-friendly and robust.

BRIEF SUMMARY

Disclosed is a device for producing shaped incoherent light to control chemical kinetics. The device includes a source of polychromatic incoherent light, where the light is used to excite a photo-responsive material, which emits a response that is collected by a lens and directed towards a diffraction grating and then on to a set of detectors. A processor receives the information from the detectors, and uses that information to adjust the power density, temporal modulation, or both, of one or all of the various wavelengths emitted by the source, in order to maximize a function of the photo-responsive material's response as part of an adaptive feedback loop. The device may optionally include an additional grating configured to direct the incoherent light from the source towards a focusing lens that focuses the light towards the photo-responsive material. The device may optionally include circuitry for controlling the temperature of the photo-responsive material. The device may optionally include a coherent light source. The source may optionally be a plurality of laser diodes, such as five or more laser diodes, where each laser diode has a different wavelength one or more of which needs to meet the requirement that they individually photo-activate the photo-responsive material. The device according to claim 1, wherein the source is configured to provide a continuous spectrum. The detectors may optionally include a photodiode, an avalanche photodiode, and/or a photomultiplier tube. The adaptive feedback loop may utilize a stochastic, deterministic or hybrid search algorithm such as a covariance matrix adaptation evolution strategy (CMA-ES) algorithm. The photo-responsive material may optionally be an up- or down-converting nanocrystal.

Also disclosed is a method for controlling the evolution of photo-responsive systems. The method includes generating a beam of polychromatic incoherent light from a source, where at least one of a power density or a temporal spectrum are capable of being shaped. The beam excites a photo-responsive material, and a response from the material is detected. Based on the response, a search algorithm (such as one belonging to the evolution strategy family) is used to identify a change in at least one feature of the beam (such as a power density of temporal feature) that, when the photo-responsive material was excited with the modified beam, would cause a response that approaches a desired system response. The method may continue by generating a modified beam based on the identified change and repeating the loop iteratively until a desired system response is achieved. Each detected response may optionally be recorded. Optionally, the source is a plurality of individual laser diodes capable of being shaped by varying the input current of each individual laser diode using a multichannel programmable current source.

DETAILED DESCRIPTION

Figure 1:
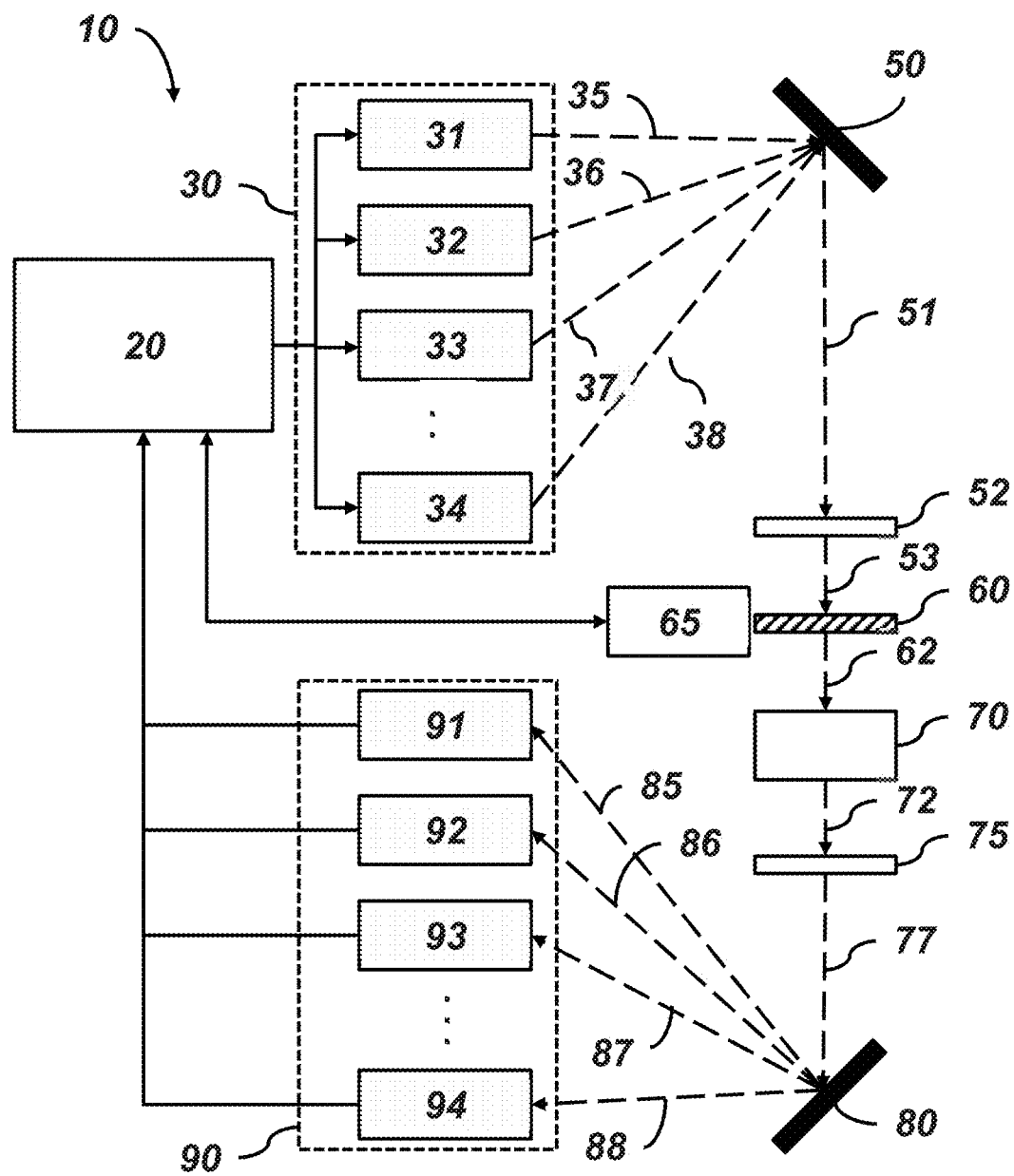
FIG. 1 is a schematic of a disclosed system.

Disclosed herein is a system and method for shaped incoherent light for control (SILC). More particularly, disclosed is a method for controlling the evolution of photo-responsive systems (including but not limited to up- and down-converting nanoparticles, photochromic polymers, and supramolecular systems such as polymer-azobenzene complexes and other complexes formed by photoisomerization) using a device capable of producing shaped incoherent light for such control. The disclosed device integrates a polychromatic incoherent source in an adaptive feedback control (AFC) loop.

The method disclosed herein is based upon incorporating a device that produces temporally and spectrally shaped incoherent light in an adaptive feedback loop. The device is currently made by refracting the output of multiple laser diodes on a grating to combine them into one single collimated polychromatic beam. The temporal spectrum of the beam can be shaped by varying the input current of each individual laser diode using a multichannel programmable current source. The beam excites the system of interest and then information about the system response is collected and recorded. Using the recorded information, a computer runs a search algorithm to determine the best control, i.e. the best temporal features of the polychromatic beam, to optimally approach the desired system's response.

The disclosed approach serves to optimally control the kinetics of a photo-responsive system by automatically tailoring the spectral properties of an incoherent source that drives the system. Shaped incoherent light for control (SILC) as disclosed herein is optimized based on the system's response of interest which can be photonic in nature or a material change or other properties of interest in the sample. SILC may be used to (1) act on system to elicit a desired useful behavior and/or to minimize undesirable behaviors, or to (2) probe a system to understand its dynamic behavior or to extract information about it.

An important feature of SILC is the ability to adjust the source characteristics (temporal and spectral) to optimize the system's response, while no detailed knowledge of the system's dynamics is necessary. This is accomplished by incorporating SILC into an adaptive feedback control (AFC) loop where the system's response (single or multi-characteristic) serves as the feedback. In other words, the system itself "teaches" SILC how best to control it.

SILC can be deployed on non-linearly responsive systems as long as they are controllable by the SILC source. This feature opens up the prospect of controlling photo-responsive systems that were previously deemed too complicated or expensive to control.

Most photochemical/material processes for chemical/material synthesis operate with the assumption that monochromatic continuous light is sufficient in the activation step. SILC lifts this restriction and should permit opening up new kinetic channels to create valuable products that could not be synthesized via a thermal route or standard photochemistry.

As such, the disclosed method can be employed to produce desired specific chemical changes in a multispecies chemical/material system where one or more species may be energized with light; SILC is designed to search for optimal controls even when the system's kinetics are non-linear, which is the case with most chemical/material systems. For example, SILC can be utilized in the development and manufacture of single compounds, macrocyclics and supramolecular complexes. By mixing a combination of reactants, precursors, sensitizers, monomers and/or inhibitors, a subset of which are photo-activated at a different peak wavelength, into a photoreactor, synthesis of a single compound, a macrocycle, or polymerization of a desirable supramolecular structure could be optimized using SILC's ability to photo-activate specific molecules in a concerted timely fashion. One advantage of the search algorithms in SILC is that they can be agnostic to the physical nature of the input parameters thus they can include the concentrations of the reactants and other relevant parameters (e.g., temperature, pressure, etc.) as optimizable parameters along with the temporal and spectral properties of the excitation source. Once optimal conditions are determined then manufacture of the desired compound, macrocycle or supramolecular structure can be easily implemented on a larger scale. Inter alia, SILC can be applied to photo-responsive materials, e.g. phosphors, to elicit a specific response which can be photonic in nature or some other response; SILC can help develop new materials for light harvesting and energy conversion; and SILC can be employed for information encryption and decryption in photo-responsive materials with memory.

Alternatively, SILC can be employed as a source for biomedical imaging and photodynamic therapy by providing controlled release delivery platforms for various pharmaceutical compounds.

Additionally SILC can be utilized in the manufacture of various photo-isomerizable compounds used in therapeutics and imaging. Further, SILC can be operated in the reverse method by utilizing the search algorithm to find a set of optical requirements needed for achieving a desired effect (e.g., high yield of energy conversion, photo-isomerization, optical cooling/heating, high yield of synthesis) and utilize the SILC platform to screen a series of compounds or materials that meet those requirements. The full applications are thus wide ranging and many possibilities exist for exploiting the SILC capability.

When SILC is deployed on non-linear systems, the effect of the excitation can be confined in space. For example, if multiple excitation wavelengths are necessary to control the process then SILC may achieve 3D spatial resolution when the individual excitation laser diodes are arranged in a crossbeam configuration.

Referring to FIG. 1, an embodiment of a system (10) is disclosed. One or more processors (20) are operably connected to, and control, a source (30) of polychromatic incoherent light. The source (30) of polychromatic incoherent light may include any such source known to those of skill in the art. The source (30) may include one or more light sources. While the particular wavelengths that the light source needs to generate will necessarily vary based on the particular photo-sensitive material, certain embodiments utilize a source (30) that generates both visible and IR wavelengths of light. In other embodiments, the source (30) generates only visible or IR wavelengths of light.

Thermal light sources such as glowing filaments, sunlight, flash lamps, etc. each confers a broad spectrum for potential use in SILC. While these sources may be utilized, they are challenging to focus and shape spectrally because they lack spatial coherence, nor can they be modulated at high frequencies without the use of external devices (e.g., electro-optic modulators). On the other hand, semiconductor-based sources such as light emitting diodes (LEDs), super-luminescent photodiodes or modulated laser diodes (LDs) can be directly modulated in the RF regime by varying their input current. Each of these sources has a narrow bandwidth compared to a thermal source, but a larger spectrum can be covered by combining several of them with different center wavelengths. LDs have two important advantages over LEDs or super-luminescent photodiodes: (1) their output spectral intensities are generally one to two orders of magnitude greater and (2) they are more spatially coherent. Building incoherent sources from LDs might seem contradictory since laser light is coherent by nature. However, the source may be considered incoherent because the LDs used have coherence times of few picoseconds while the fluorescence of a photo-responsive material is integrated over (at least) microseconds and the LDs bear no phase relationship to each other.

Thus, preferred embodiments include, but is not limited to, a plurality of laser diodes (31, 32, 33, 34). In preferred embodiments, the source (30) comprises five or more laser diodes (31, 32, 33, 34), each diode configured to emit a beam of light (35, 36, 37, 38) having a unique peak wavelength, one or more of which needs to meet the requirement that they individually photo-activate the photo-responsive material (60) be it a chemical species, biochemical species or material compound. In certain embodiments, the number of individual peak wavelengths the source generates is based on the number of fundamental up- or down-conversion transitions of a photo-responsive material.

Some embodiments use LDs that cover a portion of the wavelengths between about 750 nm and about 1600 nm. One example setup consists of collimated outputs of seven commercially available mid-power LDs (785 nm±3 nm, 90 mW; 808 nm±3 nm, 200 mW; 830 nm±3 nm, 200 mW; 905 nm±3 nm, 100 mW; 980 nm±3 nm, 200 mW; 1320 nm±3 nm, 300 mW; 1550 nm±8 nm, 300 mW; Thorlabs Inc.) that were refracted on a grating to recombine them into a single beam. The resulting polychromatic beam was focused on the sample with a lens (f=5 cm). The LDs were driven by an eight channels programmable current source built around an 80 MHz microprocessor (PIC32MX795F512H, Microchip Inc.). Each channel could output a particular current waveform (including, but not limited to, prerecorded current waveform) whose shape, resolution and length could be adjusted independently. Note that the waveforms that control the output of the source are sometimes referred to herein as "SILC controls". Care was taken to eliminate crosstalk between the LD channels. The current resolution was 16 bits. The minimum time resolution per channel was 2 µs corresponding to the shortest possible optical pulse.

The output power of a LD follows the equation $P=\eta(I-I_{Th})$ where $I_{Th}$ is the current threshold and $\eta$ is the slope efficiency in W/A. Below $I_{Th}$ there is no laser emission, and the diode's output power is negligible. No attempt was made to precisely measure the value of $I_{Th}$ or $\eta$ as they are specific to each LD and usually change over time as the LD is operated. The maximum current, $I_{max}$, that each channel could output did not exceed the maximum input current indicated in the manufacturer's datasheet.

In some embodiments, a coherent source (not shown in FIG. 1), in addition to the incoherent source, is also utilized. The coherent source is otherwise controlled in the same fashion as the incoherent source and may be optimized using the same adaptive feedback loop.

In FIG. 1, optional grating (50) is configured to direct the light (35, 36, 37, 38) emitted from the source (30) towards (51) an optional focusing lens (52). The focusing lens (52) then focuses the light (53) towards a photo-responsive material (60).

The photo-responsive material (60) may include any material that responds to at least one of the unique peak wavelengths emitted by the source (30), and preferably comprises an up- and/or down-converting nanocrystal, photo-responsive supramolecular systems including pseudorotaxanes, rotaxanes, azobenzene-polymer complexes, porphyrins, cholesteric liquid crystals, rare earth and other metal-polymer complexes.

In one example, the photo-responsive material was $Gd_2O_2S$ doped at 6% with $Er^{3+}$. This is a well-known upconverting phosphor (UCP) that can efficiently shift near-IR light into the visible spectrum. UCP materials have a wide range of applications including, solar energy harvesting, medical therapeutics and bioimaging, and gain media in lasers.

The $Gd_2O_2S:Er^{3+}$ (6%) powder absorption spectrum is characterized by sharp peaks that are indicative of a homogeneous crystal field: only one lattice site is available for the $Er^{3+}$ ion in the crystal host. A scheme based on the $Er^{3+}$ ions energy levels depicts potential mechanisms responsible for light upconversion: ground state absorption (GSA), excited state absorption (ESA) and energy transfer upconversion (ETU). While ESA and ETU are possible phenomena with dye molecules, the long-lived excited states of $Er^{3+}$ makes these processes much more likely resulting in substantial and observable populations in highly excited states.

ETU occurs in optical materials that are highly doped with lanthanides. When embedded in a solid matrix, an $Er^{3+}$ ion may interact with a close neighbor. An excited $Er^{3+}$ ion can spontaneously relax to the ground state by transferring its energy to a nearby $Er^{3+}$ ion. If that ion is already in an excited state, the added energy promotes it to a higher energy level whose luminescence to the ground level has a shorter wavelength than the incident photons. This process can be viewed as analogous to a bimolecular elementary reaction where new species are created when the reactants collide. However, in this case neither the 'reactants' nor the 'products' can freely diffuse (although energy migration between neighboring $Er^{3+}$ ions is tantamount to a diffusion mechanism). Note that ETU is reversible and may also depopulate excited states.

Of the seven LDs used in the example system, four of them, 808 nm, 830 nm, 980 nm and 1550 nm were resonant with $Er^{3+}$ near-IR fundamental transitions which permit initiating upconversion processes. The three other LDs (785 nm, 905 nm and 1310 nm) do not interact with ground state $Er^{3+}$ ions but may resonate with transitions between excited states thereby exciting the sample through ESA. Other commercially available LDs (e.g., 405 nm, 450 nm, 488 nm, 515-532 nm and 650-680 nm) could have been used to directly promote $Er^{3+}$ ions into the targeted levels, but the example approach chose to populate the latter via upconversion schemes (i.e., using only near-IR light) to allow for non-trivial controls, again mimicking the complexity expected in multi-species chemical reactions.

Both ESA and ETU are inherently non-linear mechanisms due to their multi-step nature. Moreover, several mechanisms might be operating in conjunction to upconvert light. These circumstances would likely render controlling the $Er^{3+}$ ion's population distribution arduous without the use of AFC techniques to guide the search for optimal controls. Instead of being an obstacle to achieving control, the apparent complexity actually enables the pattern recognition algorithm to simultaneously explore multiple routes leading to the best attainable solution. This counterintuitive fact is validated by numerous successful AFC experiments performed on non-linear systems.

In some examples, samples were made by mixing $Gd_2O_2S:Er^{3+}$ (6%) powder in polyurethane and applying a thin coating on a microscope glass slide.

The system (10) may optionally include temperature control circuitry (65), which may include a resistive heating element and/or a Peltier device, in order to control the temperature of the photo-responsive material (60).

The photo-responsive material may respond to excitation from the source by emitting (62) of at least one wavelength of light. As shown in FIG. 1, a lens (70) is configured to collect the emission (62) from the photo-responsive material (60) and pass it throughs (72) a filter (75) that prevents any scattered excitation light from reaching the detectors (91, 92, 93, 94), and direct it (77) toward a grating (80) for diffracting the collected emission (72, 77). The diffracted emission (85, 86, 87, 88) is then captured by at least one detector (90), and may include, but is not limited to, a plurality of detectors (91, 92, 93, 94). Each detector should be capable of recording a different emission band. There is no explicit limit to the number of detectors required; the number depends on how many wavelengths a user desires to monitor simultaneously. For example, one could have multiple notch filtered avalanche photodiodes (APDs) for monitoring, e.g., 480 nm, 540 nm, 660 nm, 800 nm, 980 nm, 1543 nm, and 2.7 μm.

Referring again to FIG. 1, each detector is operably connected to the one or more processors (20). The one or more processors (20) takes the responses received from the at least one detector (90), and using an search algorithm, identifies a change in a power density feature, a temporal feature, or a combination thereof, in the polychromatic light source (30) that, when the photo-responsive material would be excited by the modified beam, the material would respond with an emission that approaches a desired system response.

The system then generates a control signal that causes the source to generate the incoherent light beam with a modified power density feature, temporal feature, or combination thereof, and the iterative loop continues.

In one embodiment, the system's AFC loop utilizes a search algorithm that is guided by analyzing relevant information from the photo-responsive material's temporal emission response. One of skill in the art could record the intensity of every $Er^{3+}$ emission line in real time (e.g., with the same time resolution as the control). However, in some embodiments, many emission lines showed highly correlated kinetics, thus the lines could be grouped into emission bands to significantly simplify the fluorescence measurement setup.

In one example, the source consists of multiple LDs. The AFC loop feeds the photo-responsive material's response back to update the control for the LDs. In one embodiment, an AFC optimization using a SILC source as the control consists of defining an objective that is a function of the photo-responsive material's response to the control, and then running an optimization algorithm to tune SILC to maximize that objective. In one example, a phosphor's emission hue was manipulated by maximizing the ratio of emission in a particular color (e.g., $Er^{3+}$'s red, green or violet emission) to the combined emission of the others. In the case of rare earth phosphors, other objective functions based on a phosphor's temporal, absorptive, and optical heating/cooling characteristics could be devised to perform SILC optimization to maximize a desired result.

In this example, the general features of a photo-responsive material's emission kinetics were first examined by using the SILC source to generate excitations of various spectral characteristics (i.e., without performing optimizations) and recording the photo-responsive material's emission with a high-resolution spectrometer (Ocean Optics Inc., Dunedin, Fla.).

Figure 2:
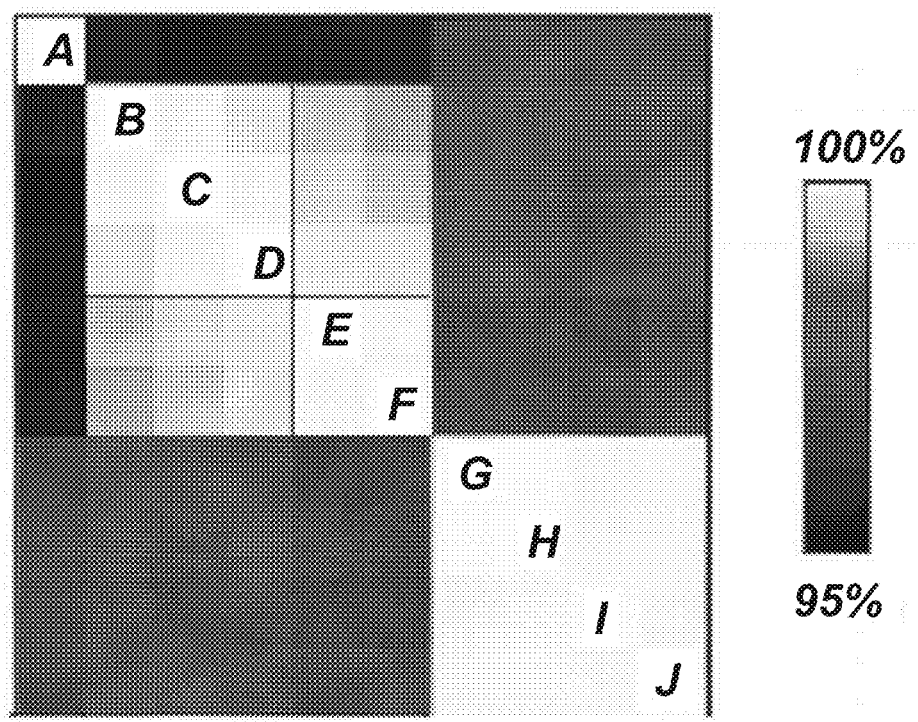
FIG. 2 is an emission correlation matrix utilizing $Gd_2O_2S$ doped at 6% with $Er^{3+}$.

In this example, the photo-responsive material's emission spectrum was recorded after one second excitation with a steady SILC pattern (i.e., with the individual LD currents held constant). The emission was integrated over 100 ms right after the excitation was turned off. The emission and absorption spectra in the visible closely mirrored each other, but they had different relative peak intensities and the emission lacks the lines from levels $^4F_{3/2}$, $^4F_{5/2}$, or $^4F_{7/2}$ expected at 444 nm, 448 nm and 488 nm, respectively. The most intense emission peaks, which correspond to individual Stark states, were labeled from "A" to "J". Their intensities, absolute as well as relative to one another, varied depending on the SILC excitation pattern as expected from non-linear optical materials. To quantify this observation, a correlation matrix (see FIG. 2) was constructed by repeating the above measurement with 10,000 randomly generated SILC patterns of different spectral characteristics. The emission peak intensities in FIG. 2 were all highly correlated (>95%), yet clear patterns are evident in the correlation matrix. Referring to FIG. 2, along the matrix's diagonal there are four blocks (>99% correlation) with each corresponding to groups of Stark states belonging to a common level: $^2H_{9/2}$ (ref. A), $^2H_{11/2}$ (refs. B, C, and D), $^4S_{3/2}$ (refs. E and F) and $^4F_{9/2}$ (refs. G, H, I, and J). At room temperature, the populations in $Er^{3+}$'s intra-level Stark states equilibrate within picoseconds; thus, their kinetics are locked together on longer time scales. Therefore, it is possible to find different population evolution between $Er^{3+}$ levels, but not within the intra-level Stark states themselves. It is interesting to notice that level $^2H_{9/2}$ (ref. A) correlates better with level $^4F_{9/2}$ (refs. G, H, I, and J) (~97.5%) than with level $^2H_{11/2}$ (refs. B, C, and D) or $^4S_{3/2}$ (refs. E and F) even though the latter are separated from $^2H_{9/2}$ by a smaller energy gap.

AFC optimizations may be performed by monitoring multiple emission bands simultaneously. In one example, three emission bands were monitored simultaneously for $Gd_2O_2S$ doped at 6% with $Er^{3+}$: $^2H_{9/2}$ (violet), $^4S_{3/2}/^2H_{11/2}$ (green) and $^4F_{9/2}$ (red). As expected from the $^4S_{3/2}$ and $^2H_{11/2}$'s rapid equilibration at room temperature, the latter two emissions showed no distinguishable kinetics within the time scale of the example (from μs to tens of ms). Consequently, their emission signals were combined. In the following, the levels are sometimes referred to by their emission color: red, green, and violet corresponding to the levels mentioned above.

In this example, the photo-responsive material's emission was collected with a microscope objective then spectrally resolved using a grating. The emission spectral components were focused on three photodiodes (FDS100, Thorlabs Inc.) for the red and green emission bands, and a photomultiplier tube (Hamamatsu Inc.) for the weak violet emission. The photodiode currents were amplified (>100 kΩ transimpedance) using a special circuit to achieve around a 1 μs rise time despite the large sensing area of the photodiodes (13 $mm^2$). A separate digitizing platform (12 bits and 2 μs time resolution per channel) was constructed to capture the four emission signals synchronously with the SILC waveforms.

Figure 3:
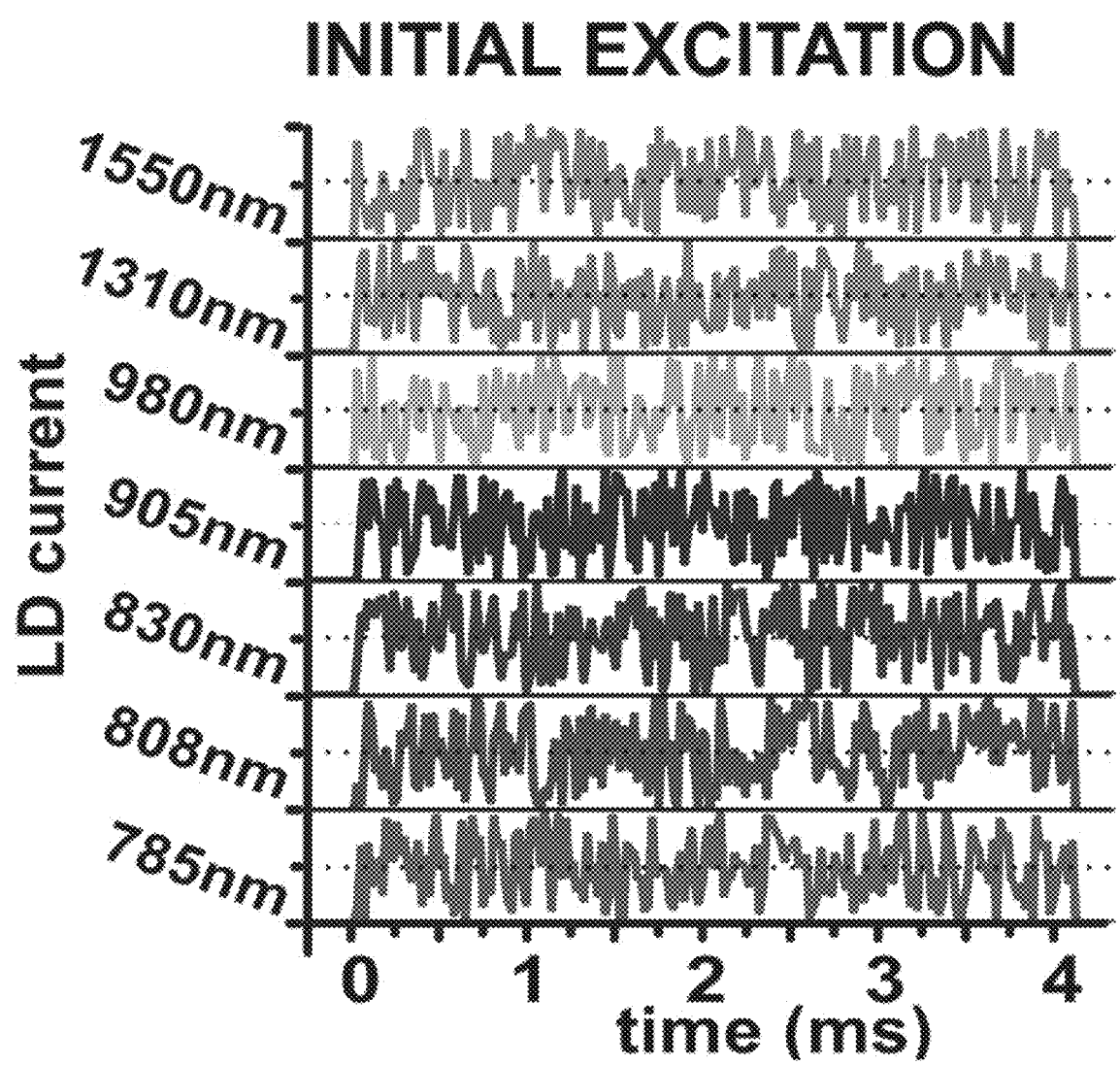
FIG. 3 is a graph of an example LD current initially generated prior to optimization of a photo-responsive material's responses.

The optimizations sought to discover SILC controls that could selectively enhance the emission of one hue while suppressing the emission from the other colors. Alternative objectives (e.g., influencing the yield of upconversion by including an additional penalty on the excitation power in the objective function) could be considered, but in this example, the emission hue was optimized to illustrate the AFC loop's capability to discover the best incoherent controls. During the AFC loop cycle, the time required to compute the new SILC patterns increases non-linearly with the control resolution; therefore, in certain embodiments it may be necessary to strike a balance between the processor's computational capability and the control resolution in order for the loop to converge in a practical time. In this example, the photo-responsive material was excited during 4 ms with SILC patterns consisting of seven current waveforms—each corresponding to a distinct wavelength—at 20 μs resolution as shown in FIG. 3. Consequently, the algorithm optimized a total of 1400 current points collectively for all of the LDs. Note that, in this example, any current intensity below the LD lasing threshold resulted in zero output power.

The objective function for the optimization of a hue (e.g., red in Eq. 1) was computed according to:

$$F_{red} = \frac{S_{red}}{S_{green} + S_{violet}} \quad (1)$$

where $S_{red}$, $S_{green}$ and $S_{violet}$ are the integrated emissions of the red, green and violet levels, respectively. The integration period, or the time window during which the objective was evaluated, can vary, such as being between 0.75 ms out to 3.75 ms. In this example, the window was chosen slightly smaller than the duration of the control to demonstrate certain relevant characteristics of AFC optimizations.

After the excitation period all signals decayed exponentially with no observable emission beyond around 8 ms. In this example, the system delayed 100 ms to ensure that the $Er^{3+}$ ions were relaxed before exciting the sample again with a new SILC pattern. The AFC loop usually converged in 10 mins after around 400 iterations. Thirty separate random SILC patterns were generated to initialize the search algorithm's first population. One of these random patterns is displayed in FIG. 3. These initial (i.e., unoptimized) random SILC controls all evoked similar responses, and one of was used as a benchmark for comparing the optimizations results (see Eq. 2).

To quantify the hue change in each optimized emission, the integrated emission of each color (e.g., $S_{red}$) was first normalized by the corresponding integrated emission color (e.g., $S_{red,0}$) in FIG. 3.

Then the change in color, for example red, was calculated according to $$\text{change (\%)} = 100 \left[ \frac{N_{red}}{N_{red} + N_{green} + N_{violet}} - \frac{1}{3} \right] \quad (2)$$

where $N_{red} = S_{red}/S_{red,0}$, etc. With Eq. 2, the emission from an unoptimized control (i.e., in FIG. 3) results in 0% change in color since in this case, $N_{red} = N_{green} = N_{violet} = 1$.

The optimization loop is started by successively exciting the sample with multiple SILC patterns. While there is no particular restriction on the number of patterns in the initial samples, the number of patterns is typically between 5 and 50, and preferably between 15 and 45.

A SILC control pattern is encoded as a set of numbers, each representing the current in one LD at a certain point of time. If sufficient information is available about the spectroscopic and kinetic aspects of the system then the initial SILC control patterns could possibly be pre-designed, but they may also simply be chosen randomly. Once the objective function values were measured for each SILC pattern, the latter were ordered with respect to their fitness (i.e., how much they each increase the objective function).

Figure 5:
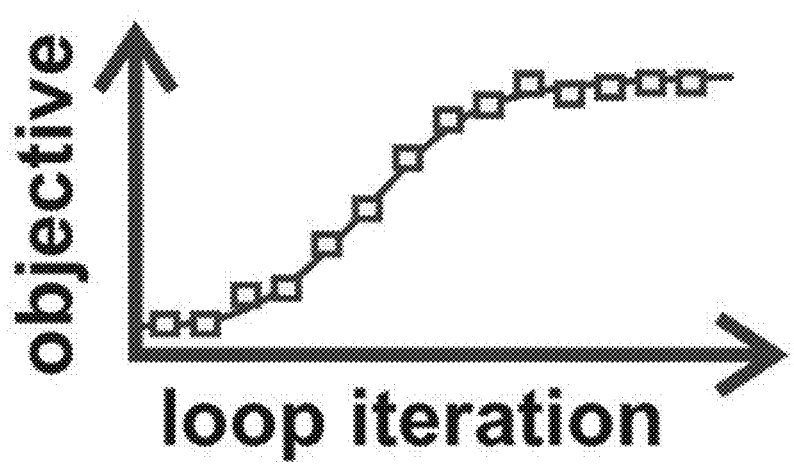
FIG. 5 is a graph showing the optimization of an objective over a number of iterative loops through the disclosed system.

The AFC loop may employ a stochastic search algorithm, including an evolutionary strategy, as is often the case in coherent control experiments. For example, the so-called covariance matrix adaptation evolution strategy (CMA-ES) algorithm may be used. In some embodiments, a new set of SILC patterns was created by "cross-breeding" within the better half of the patterns. Cross-breeding consists of randomly combining half the encoding numbers of one SILC pattern with half of another to create a new SILC pattern, and then each new pattern may then be subjected to small, random perturbations. The magnitude and probability of occurrence of the perturbations are adjustable parameters of the optimization algorithm. The AFC loop was run with the new SILC patterns iteratively until no appreciable increase in fitness was observed (see FIG. 5). When the fitness plateaued, the SILC patterns in the present experiments tended to converge toward a similar shape that was optimal under the circumstances for a particular hue. Without pre-designing the SILC controls, the iterative process converged within minutes.

Each optimization (see FIGS. 4A, 4B, and 4C) was successful in finding SILC controls that could reproducibly manipulate the emission hue of the sample. But in all optimizations the 785 nm, 905 nm and 1310 nm LD current waveforms did not significantly depart from $I_{max}/2$ (data not shown in the figures) which is the average of random samples taken between 0 and $I_{max}$. This result indicates that no shaping pressure was exerted by the AFC loop on these waveforms; therefore, it appears that for this photo-responsive material, 785 nm, 905 nm and 1310 nm excitations did not take part in any upconversion mechanism. However, the role played by these wavelengths might be different with enhanced control resources reflected in increased LD power.

Figure 4A:
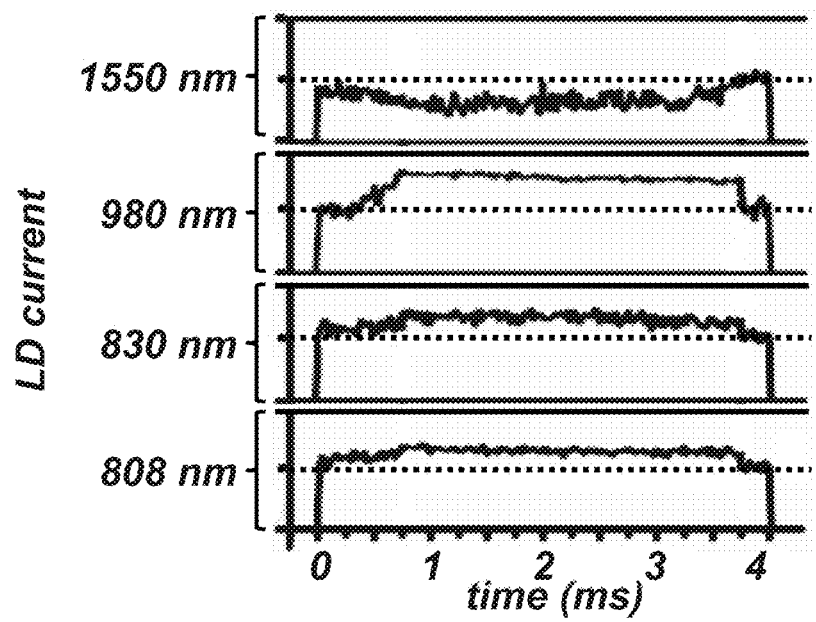
FIG. 4A is a graph of an example LD current to optimize a photo-responsive material's green response.
Figure 4B:
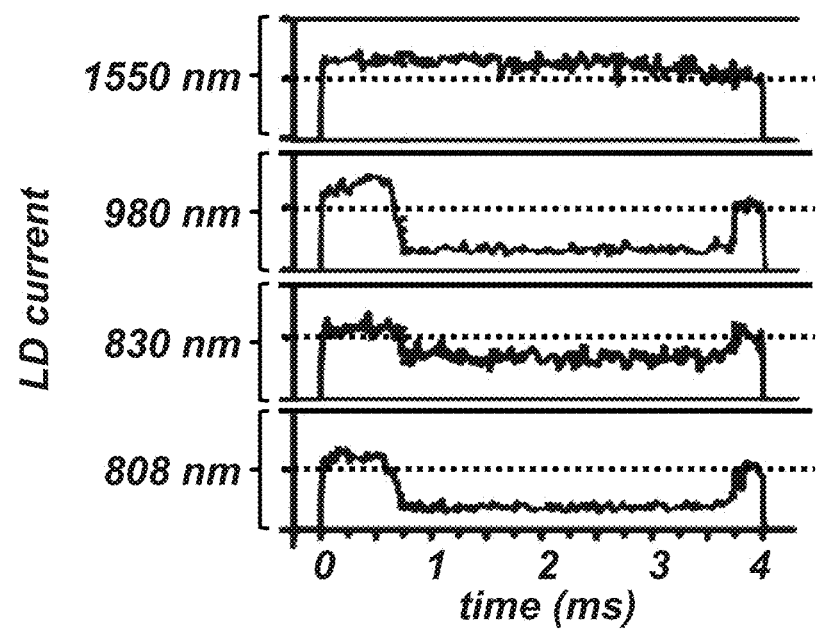
FIG. 4B is a graph of an example LD current to optimize a photo-responsive material's red response.
Figure 4C:
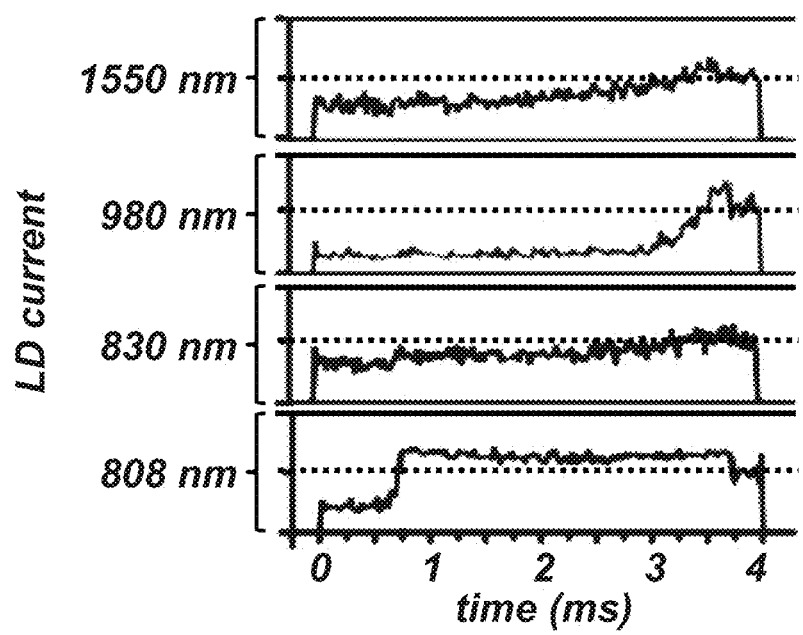
FIG. 4C is a graph of an example LD current to optimize a photo-responsive material's violet response.

In AFC optimizations it is not necessarily the case that each trial discovers the same control solution for a given objective. However, in this example, it was the case, therefore each optimization was repeated sixteen times to improve the SILC control's signal-to-noise ratio. FIGS. 4A, 4B, and 4C show the best (averaged) SILC control discovered with the objective of enhancing the green, red and violet hues respectively.

Optimized SILC patterns in this example clearly exhibit three temporal domains: before (0 ms to 0.75 ms), during the recorded optimization window (0.75 ms to 3.75 ms), and after (3.75 ms to 4 ms) the signal optimization. Naturally, we expect the shape of the SILC control to be optimized during the measurement of the objective (e.g., between 0.75 ms and 3.75 ms in this example) since during that period the control directly affects the objective. By virtue of causality, in this example, we also expect that no particular shaping should occur after the measurement of the objective (i.e., after 3.75 ms). But it is possible that the control could be shaped before the measurement of the objective because this early part of the SILC control could affect the emissions thereafter. These basic experimental checks, which are verified below, confirm that the AFC loop is behaving properly.

In this example, optimizing the green hue increased the proportion of the green emission by 5±1% while the proportions of the red and violet emissions were reduced. In the corresponding optimized control, the currents in the 808 nm and 980 nm LDs plateaued between 0.75 ms and 3.75 ms. The 1550 nm LD current slowly decreased from its initial value to level off after 0.75 ms and then increased again at around 3.25 ms. Between 0.75 ms and around 3.25 ms the 1550 nm LD current remained under the lasing threshold, which means that the 1550 nm LD was effectively turned off. This behavior suggests that the 1550 nm LD would negatively affect the desired outcome if turned on during that time. The greatest change of color was achieved with the red hue optimization. Although the absolute intensity of all emissions was lower compared to the initial signals, the relative proportion of red emission increased by 10±3% while the green and violet hues decreased. The 1550 nm LD current started high but decreased towards 3.75 ms. An abrupt drop to a current below the LDs lasing threshold occurred in the 808 nm and 980 nm LDs just before 0.75 ms. The optimization algorithm shut these LDs down during the objective measurement because their emission negatively affected the desired outcome. A slight drop in current also occurred with the 830 nm LD. It appears as if the sample was 'primed' with 808 nm, 830 nm and 980 nm excitations between 0 ms and 0.75 ms so as to boost the red emission between 0.75 ms and 3.75 ms when only the 1550 nm LD was active.

Contrary to the red and green hue optimizations where the control waveforms are 'flat' between 0.75 ms and 3.75 ms, the best control for enhanced violet showed distinct temporal features: the 808 nm LD current started and remained high but the 830 nm, 980 nm and 1550 nm LD currents show distinct temporal variations. The 980 nm and 1550 nm current waveforms started below the LDs lasing threshold, but the 980 nm current waveform surged after around 3.25 ms while the 1550 nm waveform increased slowly. This behavior suggests that the search algorithm adjusted the LD currents to exploit newly opening upconversion pathways that increased the objective during the late stage of the control.

As expected, it is seen that all the optimized SILC controls' waveforms promptly returned to around $I_{max}/2$ (see dotted lines in excitation patterns FIGS. 4A, 4B, and 4C) after 3.75 ms indicating that no shaping pressure was exerted by the AFC loop after the end of the signal optimization. The last optimization clearly shows that the relative emission enhancement depends on the length of the time window: a time window shorter than 3 ms would prevent the rise of the 980 nm excitation while a longer one may let it reach saturation. The length of the time window may be included as an optimization parameter in the AFC loop but, in this example, the scope was limited to a fixed time window of 4 ms.

A major goal in photochemistry is control over the product channels. Often UV excitation is required to drive the reaction and the deposited energy far exceeds the enthalpy of formation of the desired products. The primary photoproducts are then formed with excess internal energy leading to unwanted side-reaction, rearrangement or fragmentation that favors the formation of the most thermodynamically stable end products. Some degree of control may be obtained by spatial confinement or prearrangement of the reactants, by using long-wavelength visible and NIR light, or by photochemical quenching. The optimizations performed above illustrate the use of SILC as another means of control in photochemistry.

AFC optimizations permit discovering controls that optimally drive a system toward a given objective without designing the control waveform prior to the experiment. However, the results of the search algorithm contain valuable mechanistic information encoded in the control's shape. To help identify plausible control mechanisms, one can also use known upconversion processes in a particular photoresponsive material. Based on this collective knowledge, one may draw a plausible picture of how the discovered controls influenced the emission kinetics of the sample for each particular optimized hue.

For example, previous research using $Gd_2O_2S:Er^{3+}$ (10%) with 2 mJ, 20 ns 1550 nm pulsed excitation concluded that the mechanisms responsible for populating $Er^{3+}$'s higher levels were mostly ETU in nature. Although the present disclosure uses approximately one to two orders of magnitude lower irradiance (e.g., a characteristic 100 mW LD beam corresponds to ~60 kW/cm² at the focus) than the prior research, both ESA and ETU mechanisms might be operating in the example above using $Gd_2O_2S:Er^{3+}$ (6%), since (1) the material is being excited for longer time periods which permit the build-up of excited state populations and (2) all of the active SILC excitations are resonant with $Er^{3+}$'s near-IR levels. Possible ESA and ETU mechanisms that are activated for the control of $Gd_2O_2S:Er^{3+}$ (6%) emission are depicted in FIGS. 6A (green optimized emissions), 6B (red optimized emissions), and 6C (violet optimized emissions).

In the analysis of any single optimized emission hue, the behaviors found with the other hue optimizations were helpful, thereby forming an overall mechanistic picture for all of the experiments. Thus, there is a consistent picture supported by the nature of the collective optimal controls found in the experiments.

Green Hue Optimization

Figure 6A:
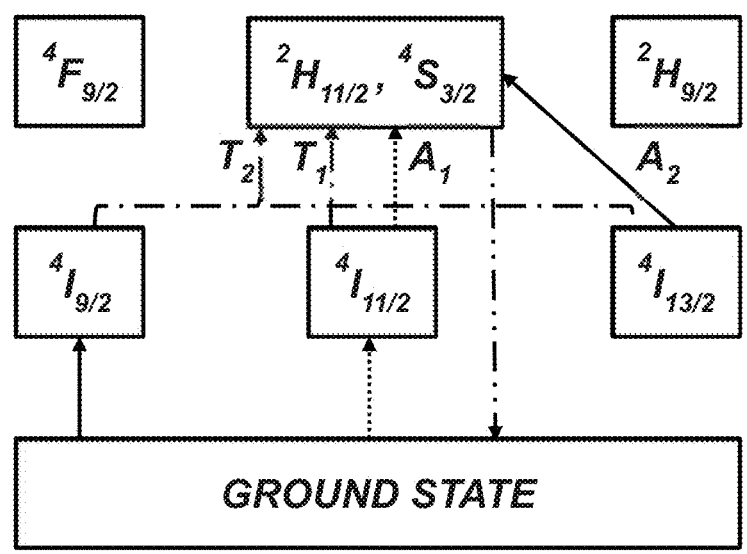
FIG. 6A is a schematic showing inferred upconversion control mechanisms for enhancing green hues of $Gd_2O_2S$: $Er^{3+}$ (6%) emission to the ground state level.
Figure 6B:
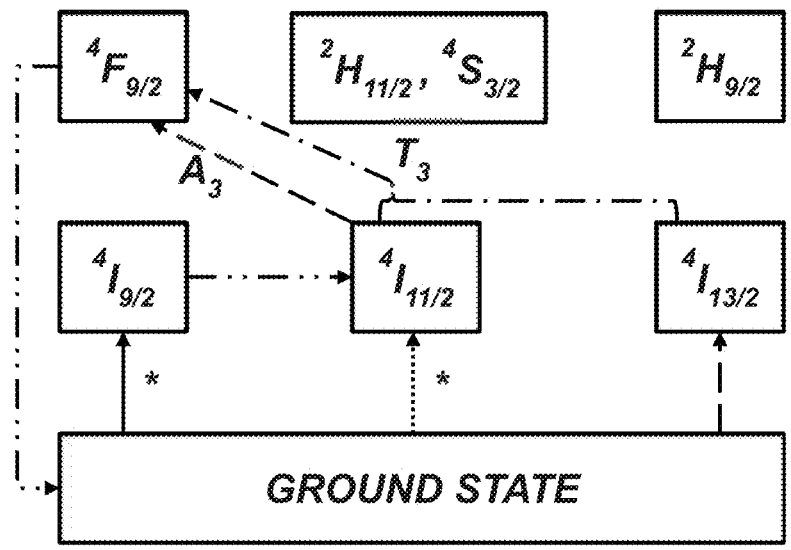
FIG. 6B is a schematic showing inferred upconversion control mechanisms for enhancing red hues of $Gd_2O_2S$:$Er^{3+}$ (6%) emission to the ground state level.
Figure 6C:
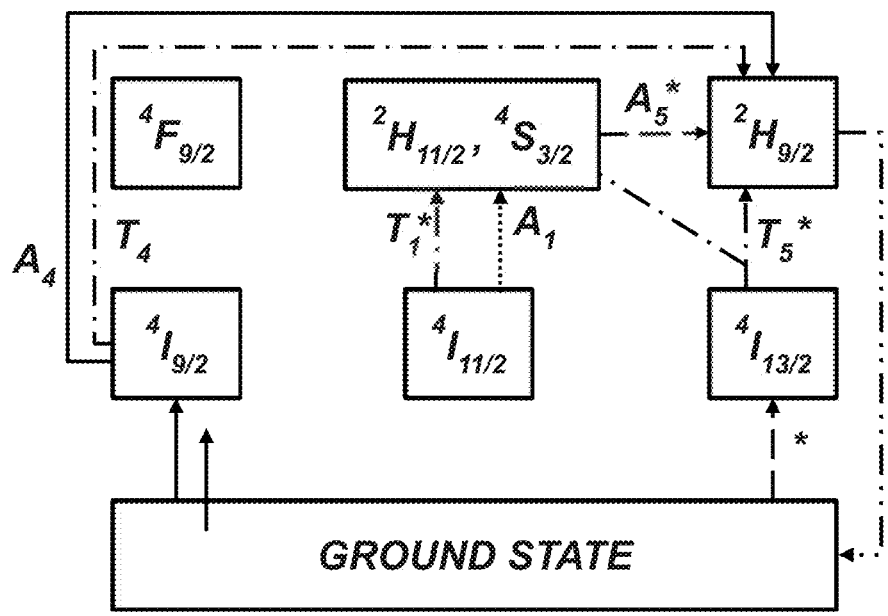
FIG. 6C is a schematic showing inferred upconversion control mechanisms for enhancing violet hues of $Gd_2O_2S$: $Er^{3+}$ (6%) emission to the ground state level.

FIG. 6A summarizes the upconversion mechanisms invoked by the SILC control for green hue enhancement. When optimizing to enhance the green emission, the strategy was to maximize the currents in the 808 nm, 830 nm and 980 nm LDs. These wavelengths can populate the green levels by ESAs $A_1$ and $A_2$, and ETUs $T_1$ and $T_2$. As previously mentioned, the algorithm shut down the 1550 nm LD during most of the control, thereby indicating that the 1550 nm excitation would lower the objective if activated. Given the fact that 1550 nm can populate the green levels by ESA from $^4I_{9/2}$ (not shown in the figure), the only way this excitation could decrease the objective function of the green hue optimization is by populating the red and violet levels more efficiently. Indeed, both red-producing ESA $A_3$ from $^4I_{11/2}$ (see FIG. 6B) and green-producing ESA from $^4I_{9/2}$ can be activated by 1550 nm light but, in general, $^4I_{11/2}$ is significantly more populated than $^4I_{9/2}$ due to their large lifetime difference (2.3 ms vs. 17.5 μs respectively) making ESA $A_3$ more efficient. Additionally, the 1550 nm excitation initiates ESA $A_5$ and ETU $T_5$ by directly populating level $^4I_{13/2}$ (see FIG. 6C) which, in turn, depletes the green-emitting level and produces violet; the outcome appears to be an additional penalizing consequence for the objective of enhancing the green hue in FIG. 6A. Mechanisms $A_5$ and $T_5$ create an anticorrelation between the populations of the green and violet levels thus explaining the relatively lower correlation between violet and green luminescence observed in the correlation matrix (see FIG. 2).

Red Hue Optimization

For the red hue optimization in FIG. 4B, the LDs were saturated during 0 to 0.75 ms to quickly populate the long-lived near-IR levels $^4I_{11/2}$ and $^4I_{13/2}$. The 808 nm and 830 nm excitations contributed to pumping the $^4I_{11/2}$ level indirectly by first exciting the $^4I_{9/2}$ level which it-self rapidly decays into the $^4I_{11/2}$ level. Then, between 0.75 ms and 3.75 ms, where signal optimization occurred, the 808 nm, 830 nm and 980 nm LDs were shut down (see * in FIG. 6B) to avoid green-producing upconversion pathways but the 1550 nm LD power was kept high. The explanation appears to be that pumping long-lived $^4I_{13/2}$ and $^4I_{11/2}$ levels (3.7 ms and 2.3 ms respectively) prior to the objective evaluation enabled the 1550 nm excitation to continue populating the red level through ESA $A_3$ and ETU $T_3$ thereafter. Moreover, although turning off the 808 nm and 980 nm LDs during signal optimization reduced the population in the red level, it did so more strongly with the green and violet because of their much shorter apparent lifetimes. This strategy helped maximize the objective, which was based on the ratio of emissions not on their absolute intensities, demonstrating that SILC could take advantage of differences in the rise and decay times.

Violet Hue Optimization

To maximize the violet hue, the SILC search exploited the violet level's faster kinetics to beat the red and green build-ups. From 0 to 0.75 ms, the LDs were kept in-active to avoid populating the near-IR levels (see FIG. 4C). Starting at 0.75 ms, the 808 nm LD current was saturated to maximize the rate of violet-producing ETU $T_4$ and ESA $A_4$. The latter mechanism is analogous to a double resonant, two-photon excitation because $^4I_{9/2}$ is resonant at ~813 nm and lies midway between the ground and $^2H_{9/2}$ levels. Thus, this circumstance can be interpreted to mean that efficient pumping of the $^2H_{9/2}$ level with 808 nm doesn't require a large $^4I_{9/2}$ pre-existing population. Pumping with 808 nm alone can only remain advantageous for a short time since it unavoidably builds up population in the lower near-IR levels thereby favoring green and red upconversions. So, with increasing population in the near-IR levels it became necessary to discover alternative violet-producing mechanisms. After ~3.25 ms, activation of the 1550 nm and 980 nm LD excitations permitted in-creasing the objective by respectively populating $^4I_{13/2}$ and the green levels via mechanisms $A_1$ and $T_1$. In turn, these levels appear to transfer their population to the violet level through ESA $A_5$ and ETU $T_5$. This late increase in excitation power also takes advantage of $^2H_{9/2}$'s faster rise time, analogous to what was observed with in the red hue optimization. The mechanisms invoked by the SILC control for the enhancement of the violet hue are summarized in FIG. 6C.

This technique and system allow one to avoid the challenges involved in, e.g., synthesizing a UCP having a particular emission color. For example, erbium-based UCPs are often co-doped with blue and red emitting ions such as Thulium(III) and Holmium(III) to balance the emission color. Similarly, $Er^{3+}$ has been shown to have blue fluorescence (470 nm), but direct excitation to this emitting level requires UV photons (317 nm) which are readily absorbed by the $Gd_2O_2S$ matrix. The disclosed system and process may be used to discover controls that best modulate the emission hue of a photo-responsive material without the need to change dopants or the host matrix.

Figure 7A:
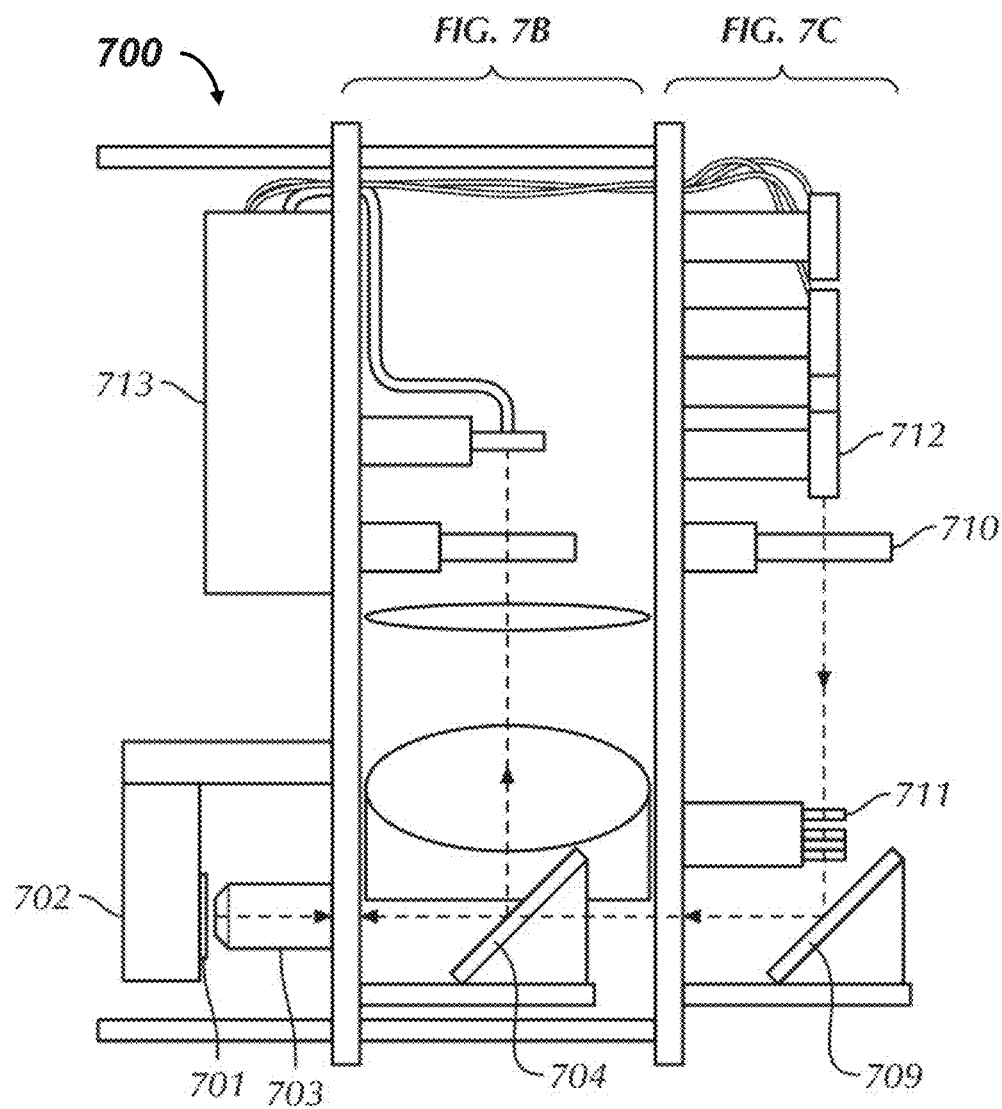
FIGS. 7A-7C are side (7A) and top (7B, 7C) of an embodiment of a disclosed system.
Figure 7B:
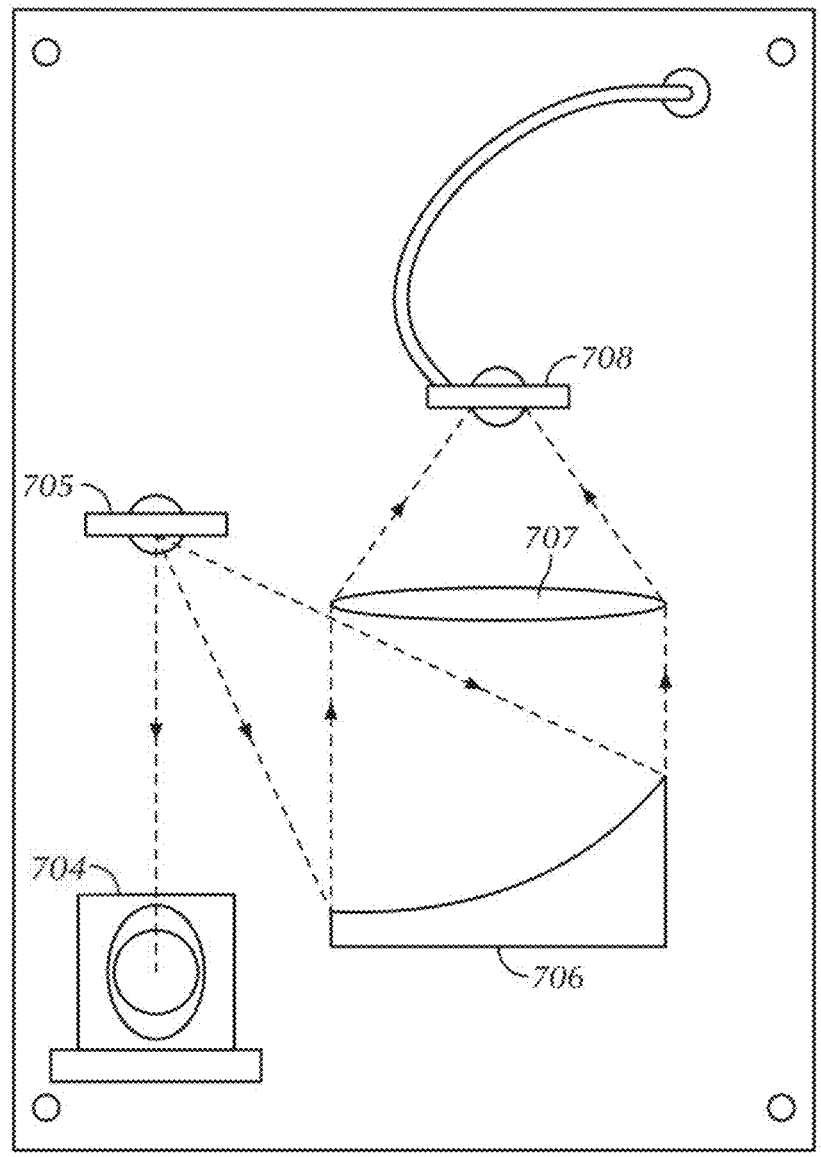
Figure 7C:
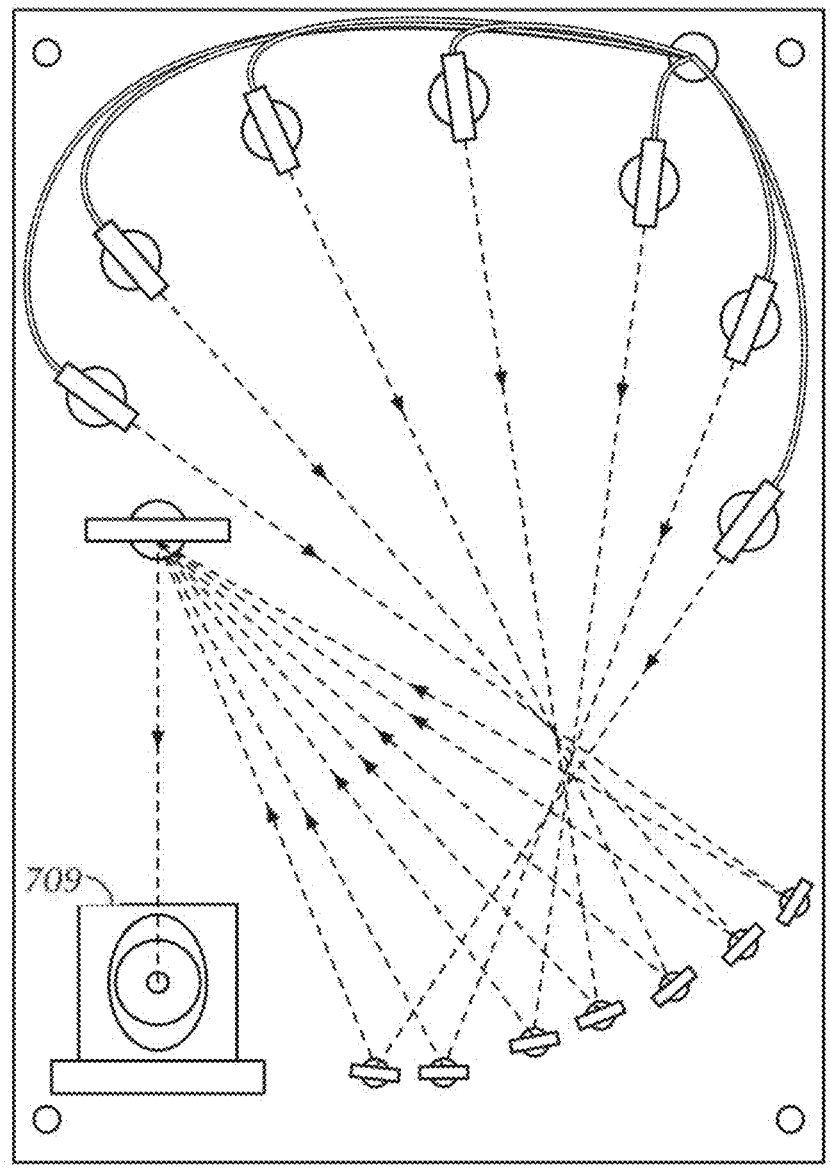

An example of one system schematic can be seen in reference to FIGS. 7A-7C. The side view is shown in FIG. 7A. The system (700) has electronic circuitry (713) that allows for synchronous operation of the laser diodes and recording of the system's response. In this example, the circuitry (713) is operably connected to a separate computer (either a desktop computer, a server on the internet, etc.), where the adaptive feedback loop is implemented. However, in other embodiments, the feedback loop is handled by an onboard computer. The circuitry (713) controls both the laser diodes on the excitation platform (see FIG. 7C) and the detector on the detection platform (see FIG. 7B). The circuitry first causes the laser diodes (712) to generate multiple wavelengths in the NIR-IR (Near InfraRed-Infra-Red) spectrum. Here, there are 7 laser diodes arranged around the top of the excitation platform (as seen in FIG. 7C). In this example, the generated wavelengths then each reflect off one of the 7 mirrors (711) at the bottom of the excitation platform, which may be gold-plated mirrors. The generated wavelengths are reflected towards a NIR-IR reflective diffraction grating (710). The combined beams are then directed towards another mirror, such as another gold-plated mirror (709). The beam passes through an opening in the base of the excitation platform, passes through a dichroic mirror (704) which is configured to pass NIR-IR but reflect UV-VIS-NIR (UltraViolet-VISible-Near InfraRed), and into a microscope objective (703). From there, the sample photo-responsive material (701), which is on a sample holder (702), is irradiated. The sample (701) then emits some light in the UV-VIS-NIR spectrum, which passes back through the microscope objective (703) and into the detection platform portion of the system. The emitted light then is reflected by the dichroic mirror (704) which is configured to reflect the emitted light towards a UV-VIS-NIR reflective diffraction grating (705). The dichroic mirror, or other filter, may also be used to prevent any scattered excitation light from reaching the detectors. The light is then reflected towards a 45° off-axis parabolic mirror (706), which directs the light up towards an aspherical condensing lens (707) and finally to a photodiode linear array (708) (such as a Si or AsGa photodiode linear array), which sends the detected signals to the electronic circuitry (713) for use with the adaptive feedback loop.

Inter alia, the disclosed approach can be used to improve or to find means of synthesizing chemicals/materials, and entities either using or marketing photo-amenable products will benefit from using such a tool as disclosed herein. The disclosed approach can also be used, inter alia, in conjunction with specially designed non-linear photo-responsive materials in a variety of applications such as, energy conversion, information processing, optical memory, optical encryption/decryption, etc.

Inter alia, the disclosed approach can be used in the domain of biological research, especially optogenetics, where the need to remotely interrogate or trigger a plurality of individually addressable light-activated proteins with proper timing is valuable for the manipulation and assessment of metabolic pathways or other cellular functions.

What is claimed:

1. A device for producing shaped incoherent light, comprising:
   a. a source of polychromatic incoherent light configured to illuminate a photoresponsive material;
   b. a lens configured to collect an emission from the photo-responsive material and direct it towards a first grating for diffracting the collected emission;
   c. a filter configured to prevent any scattered excitation light from reaching the detectors;
   d. one or more detectors in the path of the diffracted emission, each detector recording a different emission band; and
   e. a processor configured to:
   i. receive a response from each detector; and
   ii. based on the response, adjust at least one feature of the source selected from the group consisting of power density and temporal modulation, to maximize a function of the photo-responsive material's response as part of an adaptive feedback loop.

2. The device according to claim 1, further comprising:
   f. a second grating configured to direct the incoherent light from the source towards a focusing lens; and
   g. a focusing lens for focusing the light towards the photo-responsive material.

3. The device according to claim 1, further comprising circuitry configured to control the temperature of the photo-responsive material.

4. The device according to claim 1, wherein the source is a plurality of laser diodes.

5. The device according to claim 4, wherein the plurality of laser diodes comprises more than five laser diodes, one or more of which needs to meet the requirement that they individually photo-activate the photo-responsive material be it a chemical species, biochemical species or material compound.

6. The device according to claim 1, wherein the detectors include at least one detector selected from the group consisting of a photodiode, an avalanche photodiode, and a photomultiplier tube.

7. The device according to claim 1, wherein the adaptive feedback loop utilizes a stochastic, deterministic or hybrid search algorithm.

8. The device according to claim 1, further comprising a coherent light source.

9. The device according to claim 1, wherein the source is configured to provide a continuous spectrum.

10. The device according to claim 1, wherein the photo-responsive material is an up- or down-converting nanocrystal.

11. A method for controlling the evolution of photo-responsive systems, comprising the steps of:
   a. generating a beam of polychromatic incoherent light from a source, where at least one of the power densities or temporal spectra are shaped:
   b. exciting a photo-responsive material with the beam;
   c. detecting a first response from the system of interest;
   d. utilizing a search algorithm to identify, based on the first response, a change in a feature of the beam that, when the photo-responsive material was excited with the modified beam, when causing a response that approaches a desired system response, where the at least one feature of the beam is selected from the group consisting of a spectral power density feature and a temporal feature.

12. The method according to claim 11, further comprising the steps of:
   e. generating a modified beam based on the identified change;
   f. exciting the photo-responsive material with the modified beam;
   g. detecting an additional response from the system;
   h. utilizing a search algorithm to identify, based on the additional response, a change in a feature of the beam that, when the photo-responsive material was excited with the modified beam, when causing a response that approaches a desired system response, where the at least one feature of the beam is selected from the group consisting of a power density feature and a temporal feature.

13. The device according to claim 11, wherein the search algorithm belongs to the evolution strategy family.

14. The method according to claim 11, further comprising recording each detected response.

15. The method according to claim 11, wherein the source is a plurality of individual laser diodes which are shaped by varying the input current of each individual laser diode using a multichannel programmable current source.

* * * * *